US012524597B1

(12) United States Patent
Sharma (10) Patent No.: US 12,524,597 B1
(45) Date of Patent: Jan. 13, 2026

(54) SYSTEMS AND METHODS TO TRAIN AND UTILIZE A FORMATTING MODEL TO FORMAT TEXT TO REFLECT CONTEXT

(71) Applicant: Suki AI, Inc., Redwood City, CA (US)

(72) Inventor: Siddharth Sharma, Haryana (IN)

(73) Assignee: Suki AI, Inc., Redwood City, CA (US)

( * ) Notice: Subject to any disclaimer, the term of this patent is extended or adjusted under 35 U.S.C. 154(b) by 318 days.

(21) Appl. No.: 18/190,597

(22) Filed: Mar. 27, 2023

(51) Int. Cl.
*G06F 40/103* (2020.01)
*G06F 40/30* (2020.01)
*G06F 40/40* (2020.01)

(52) U.S. Cl.
CPC ............ *G06F 40/103* (2020.01); *G06F 40/30* (2020.01); *G06F 40/40* (2020.01)

(58) Field of Classification Search
CPC ......... G06F 40/103; G06F 40/30; G06F 40/40
See application file for complete search history.

(56) References Cited

U.S. PATENT DOCUMENTS

| 9,135,231 | B1 * | 9/2015 | Barra ..................... G06F 40/151 |
| 2010/0076761 | A1 * | 3/2010 | Juergen ............... G10L 19/0018 704/235 |
| 2014/0348311 | A1 * | 11/2014 | Chang ................... H04M 3/493 379/88.18 |
| 2023/0335111 | A1 * | 10/2023 | Hassid ..................... G10L 13/08 |
| 2024/0087572 | A1 * | 3/2024 | Pathak ..................... G10L 15/08 |
| 2024/0153495 | A1 * | 5/2024 | Wang ....................... G10L 15/26 |

* cited by examiner

*Primary Examiner* — Athar N Pasha
(74) *Attorney, Agent, or Firm* — Esplin & Associates, PC (57) ABSTRACT

Systems and methods to train and utilize a formatting model to format text generated automatically by natural language interpretation of speech to reflect context are disclosed. Exemplary implementations may: obtain training information; train a formatting model based on the training information; employ, in an ongoing manner until receipt of an indication to terminate, a trained formatting model to format an unformatted textualized input made up of unformatted textualized segments that proceed from a beginning to an end by recursively: obtaining an unformatted textualized segment; determining whether context is available; processing the next unformatted textualized segment to generate a formatted textualized segment based on the context; subsequently assigning the formatted textualized segment as the context; effectuating, subsequent to generating the formatted textualized segment, presentation of the formatted textualized segment; and terminate, upon receipt of the indication to terminate, employment of the formatting model.

18 Claims, 4 Drawing Sheets

SYSTEMS AND METHODS TO TRAIN AND UTILIZE A FORMATTING MODEL TO FORMAT TEXT TO REFLECT CONTEXT

FIELD OF THE DISCLOSURE

The present disclosure relates to systems and methods to utilize a trained formatting model to format text generated automatically by natural language interpretation of speech to reflect context.

BACKGROUND

Clinicians typically write extensive notes to record a plurality of information for patients. The clinicians often use automated speech-to-text systems to transcribe spoken notes to textual notes. Automatic Speech Recognition (ASR) systems generally produce a literal transcript of live speech inputs. These speech-to-text systems require methods to transform the output text into a readable format that includes appropriate punctuations, normalization (i.e., words to numbers, dates, medical quantities, etc.), and other formatting.

SUMMARY

One aspect of the present disclosure relates to a system configured to format verbatim transcripts with grammar, proper syntax, and/or other formatting rules. The system includes a formatting model that is trained by this system based on machine-learning techniques, finalized transcripts that are well-formatted, unfinalized transcripts that merely include verbatim transcription of speech, and/or other information. Thus, the trained formatting model may be employed by transmitting and inputting an unformatted textualized segment that represents an utterance by a user, and the trained formatting model may format such unformatted textualized segment based on available context to the unformatted textualized segment, the learned formatting from the training, and/or other information. Such transmission and input of individual unformatted textualized segments to the trained model may occur recursively, until speech ends or until an indicate to terminate, while the user utters subsequent utterances and thus provides additional unformatted textualized segments. Thus, the necessity for text formatting of transcripts by another user or team of users before they are saved and/or used for clinical documentation is resolved with this system in a more efficient and immediate manner that may only improve with time.

One aspect of the present disclosure relates to a system configured to train and utilize a formatting model to format text generated automatically by natural language interpretation of speech to reflect context. The system may include electronic storage, one or more hardware processors configured by machine-readable instructions, and/or other elements.

The electronic storage may store a formatting model, training information, a context parameter, and/or other information. The training information may include (i) unfinalized transcripts that individually represent a set of utterance from users, (ii) finalized transcripts that correspond to the unfinalized transcripts, (iii) context, and/or other training information. The individual unfinalized transcripts may be made up of unformatted text segments. The finalized transcripts may be made up of formatted text segments. The context may include individual ones of the formatted text segments that precede individual ones of the text textualized segments so that the context is for the unformatted text segments.

The machine-readable instructions may include one or more instruction components. The instruction components may include computer program components. The instruction components may include one or more of obtaining component, model training component, model storing component, model employment component, termination component, and/or other instruction components.

The obtaining component may be configured to obtain the formatting model. The obtaining component may be configured to obtain the training information.

The model training component may be configured to train the formatting model to format individual unformatted text inputs by using the unformatted text segments and the context as training inputs and the formatted text segments as training outputs such that the formatting model is trained to determine formatting rules implemented in the formatted text segments based on the unformatted text segments and the context.

The model storing component may be configured to store the trained formatting model to the electronic storage.

The model employment component may be configured to employ the trained formatting model. The trained formatting model may be employed in an ongoing manner until receipt of an indication to terminate. The trained formatting model may format an unformatted textualized input made up of unformatted textualized segments that proceed from a beginning to an end by: (a) obtaining a next unformatted textualized segment that represents an utterance by a user, (b) determining whether the context parameter is assigned a value, (c) upon determination that the context parameter has the value, processing the next unformatted textualized segment to generate a formatted textualized segment based on the value to the context parameter, and subsequently assign the formatted textualized segment to the context parameter, (d) upon determination that the context parameter has no value, processing the next unformatted textualized segment to generate the formatted textualized segment and assign the formatted textualized segment to the context parameter, (e) effectuating, subsequent to generating the formatted textualized segment, presentation of the formatted textualized segment via a client computing platform; and (f) returning to (a). The next unformatted textualized segment that is obtained may be adjacent to the formatted textualized segment that was formatted in either step (c) or step (d). The value to the context parameter may be a formatted text segment that preceded a given unformatted textualized segment.

The termination component may be configured to terminate, upon receipt of the indication to terminate, employment of the trained formatting model.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
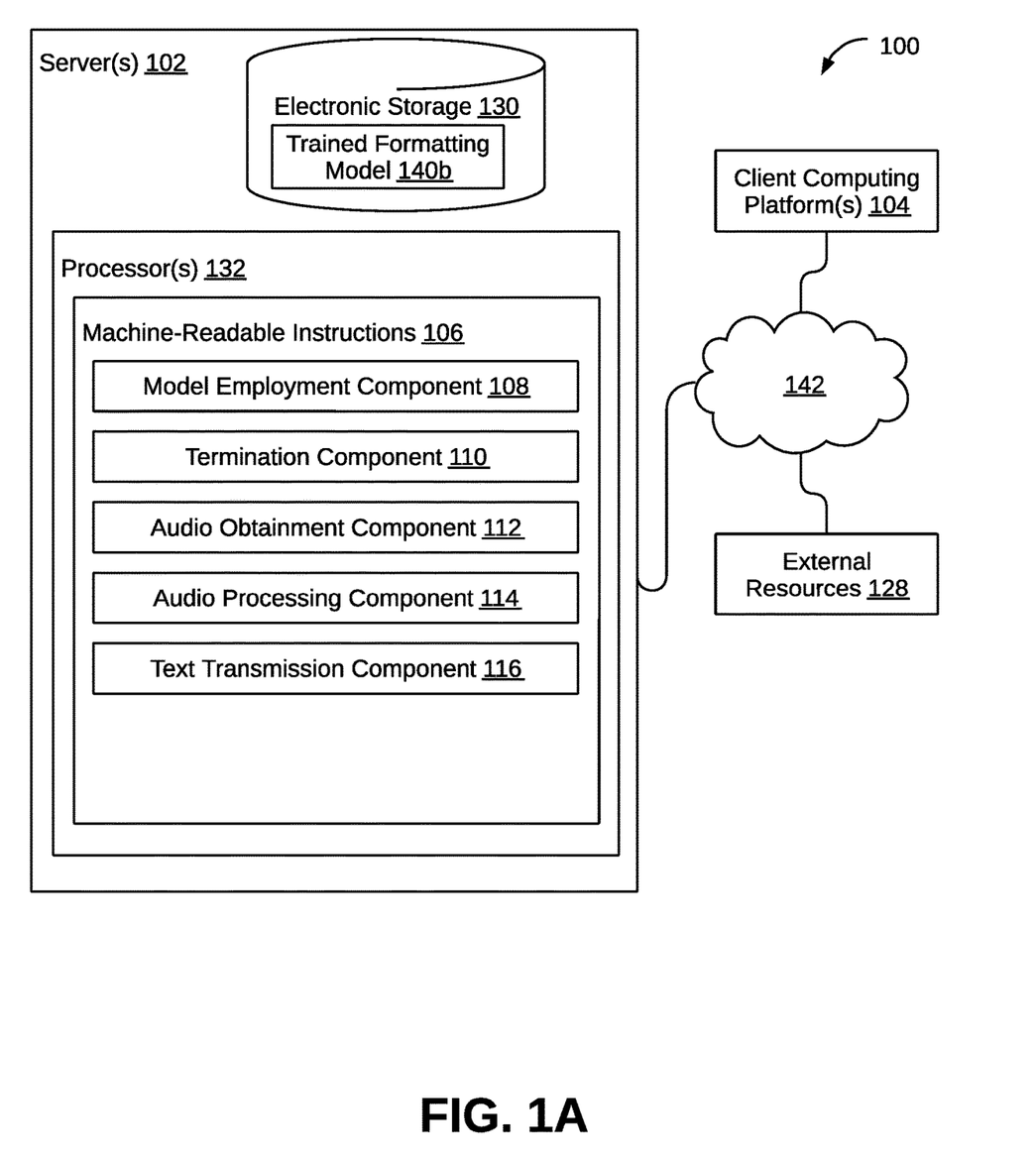
FIG. 1A-1B illustrates a system configured to train and utilize a trained formatting model to format text generated automatically by natural language interpretation of speech to reflect context, in accordance with one or more implementations.
Figure 1B:
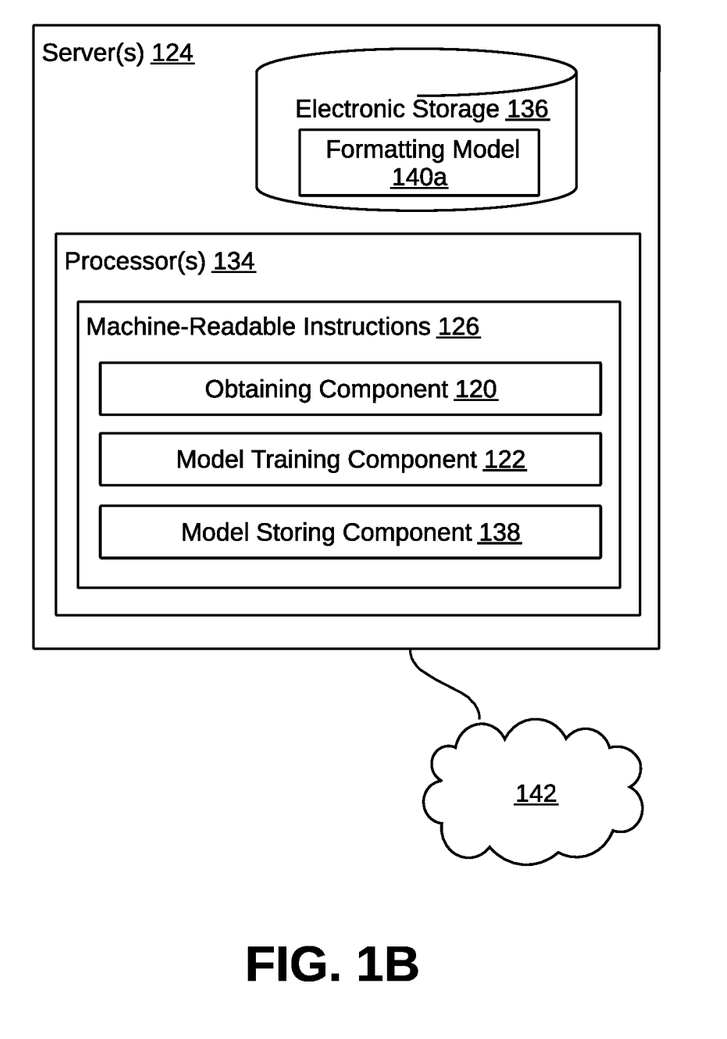

FIG. 1A-B illustrate a system 100 configured to train and utilize a formatting model 140 to format text generated automatically by natural language interpretation of speech to reflect context, in accordance with one or more implementations. In some implementations, system 100 may include one or more servers 102, servers 124 of FIG. 1B, and/or other elements. Server(s) 102 and/or 124 may be configured to communicate with one or more client computing platforms 104 according to a client/server architecture and/or other architectures. Client computing platform(s) 104 may be configured to communicate with other client computing platforms via server(s) 102 and/or 124 and/or according to a peer-to-peer architecture and/or other architectures. Users may access system 100 via client computing platform(s) 104.

Referring to FIG. 1B, electronic storage 136 may be similar to electronic storage 130 of FIG. 1A described herein, but included in server(s) 124. In some implementations, electronic storage 136 and electronic storage 130 may communicate via network 142 (the same as in FIG. 1A) or may be the same storage media, and thus store the same information.

Electronic storage 136, and/or electronic storage 130, may store a formatting model 140a, training information, and/or other information. The training information may include (i) unfinalized transcripts that individually represent a set of utterance from users, (ii) finalized transcripts that correspond to the unfinalized transcripts, (iii) context, and/or other training information.

The individual unfinalized transcripts may be made up of unformatted text segments. The finalized transcripts may be made up of formatted text segments. Individual text segments, whether formatted or unformatted, may include one or more texts of words that represent individual utterances from the users. An utterance may refer to a complete sentence, an incomplete sentence, a phrase, a term, and/or other utterances uttered by the users. An unformatted text segment may be absent of punctuation, capitalization, numerals, hyphenated terms, and/or other formatting rules. A formatted text segment may include such formatting rules.

In some implementations, the unfinalized and finalized transcripts may be obtained from external resources 128 of FIG. 1A, such as electronic medical record databases and/or other document databases. The finalized transcripts may include notes stored in electronic storage 130 in FIG. 1A, electronic storage 136, and/or other storage, though still accessible by server(s) 124. In some implementations, the unfinalized transcripts may be converted text from training audio inputs, similar to audio inputs described herein.

The context included in the training information may include individual ones of the formatted text segments that precede individual ones of the unformatted text segments so that the context is for the unformatted text segments.

Server(s) 124 that may be configured by machine-readable instructions 134. Machine-readable instructions 134 may include one or more instruction components. As described herein, server(s) 124 may be similar to server(s) 102 of FIG. 1A, and machine-readable instructions 134 may be similar to machine-readable instructions 106 of FIG. 1A, but executed by server(s) 124. The instruction components may include one or more of obtaining component 120, model training component 122, model storing component 138, and/or other instruction components. In some implementations, components 120, 122, and/or 138 may be included in as machine-readable instructions 106, therefore the functionality of all the components are executed by server(s) 102. In some implementations, components 108, 110, 112, 114, 116, and/or 118 may be included in as machine-readable instructions 126, therefore the functionality of all the components are executed by server(s) 124.

Obtaining component 120 may be configured to obtain formatting model 140a from electronic storage 136. Obtaining component 120 may be further configured to obtain the training information from electronic storage 136.

Model training component 122 may be configured to train formatting model 140a to format individual unformatted text inputs. The term "format" and variations thereof, as used herein, may refer to implementation of grammar (e.g., punctuation), syntax, spacing, and/or other configurations of words, letters, numbers, phrases, punctuation, paragraphs, parameter with values, among others included in a note or other document. The individual unformatted text inputs may be various unformatted text that is input for anticipated formatting. By using the unformatted text segments and the context as training inputs, and the formatted text segments as training outputs, formatting model 140a may be trained. As such, formatting model 140a may be trained to determine formatting rules implemented in the formatted text segments based on the unformatted text segments and the context. The determined formatting rules may be learned, saved, and evoked for implementation during utilization of formatting model 140a once trained. The training inputs and the training outputs may be information that are closely correlated. That is, for example, a reoccurring training input may correspond to a training output that often has a first formatting rule implemented. Thus, such training input and training output may be closely correlated.

Formatting model 140a may be trained based on the training inputs, the training outputs, and/or other information by using known and/or novel machine learning techniques and/or other training techniques. In some implementations, formatting model 140a may be continuously or periodically trained based on the training information as more of the training information is obtained and stored to electronic storage 136, and/or as model training component 122 obtains access to other electronic storage. That is, while formatting model 140a is not being employed (i.e., trained formatting model 140b herein), formatting model 140a may be continuously trained based on the training information and/or other information. In some implementations, formatting model 140a may be trained periodically every week, every month, or other period of time, or at a point in time that new training information is obtained or accessible.

In some implementations, formatting model 140a may include an encoder and a decoder that are trained based on the unfinalized transcripts and the finalized transcripts. Training formatting model 140a may include inputting text segments into the encoder to generate high-dimensional representations of the unformatted text segments. The text segments may include the unformatted text segments and corresponding formatted text segments. In particular, the encoder may map the individual unformatted textualized segments that correspond to individual utterances of the user (i.e., natural language) into the high-dimensional representations. The high-dimensional representation may capture features or patterns of the individual utterances, and thus the corresponding individual unformatted textualized inputs. The features and/or patterns may include, by way of non-limiting example, patterns of parts of speech (an adjective followed by a noun followed by a verb), tense, pronouns following nouns, particular words as a conjunction (e.g., one-eighty over twenty), among others.

The high-dimensional representations may include particular statistical representations, sets of phenomes, a combination numerical-alphabetical values, vectors (e.g., internal state vectors, context vectors), and/or other representations that are based on multiple ones of the features and/or patterns.

The statistical representations may refer to numbers and/or other information that represent the unformatted textualized segments in a computable format. That is, the statistical representations may be utilized by other components, processing units, algorithms to effectuate formatting that output formatted textualized segments. In some implementations, individual ones of the statistical representations may be associated with a phoneme. Individual phonemes may be a unit of sound that distinguishes a word from other words. A difference in a single phoneme may alter a word and thus a meaning of a statement that a user intends. An amount of phonemes may vary per language.

In some implementations, the high-dimensional representations, and thus the encoder, may leverage a multi-headed self-attention mechanism. The multi-headed self-attention mechanism may refer to performing the self-attention mechanism multiple times in parallel. The multi-head self-attention mechanism may be leveraged to capture long-range dependencies in the unformatted textualized segments that represent natural language sentences or portions thereof uttered by the users. The long-range dependencies may refer to relations that may exist between different words of individual textualized segments, regardless of whether the textualized segments include multiple words (e.g., 7+words, 10+words). That is, by way of non-limiting example, a first word and a second word of a given textualized segment may frequently have three words in between them. Each word included in (i.e., input token) in the individual unformatted textualized segments may focus on every other word or sets of words in the individual unformatted textualized segments, including itself (i.e., context). This allows the encoder to learn which words in the individual unformatted textualized segments are most relevant to each other and focus on them while encoding the individual unformatted textualized segments.

Training formatting model 140a may include inputting the high-dimensional representations to the decoder to generate the formatted textualized segment. That is, the decoder may be trained to generate individual formatted textualized segments based on the higher-dimensional encoded unformatted textualized segments received from the encoder.

In some implementations, the decoder may leverage the multi-head self-attention mechanism and implement Encoder-Decoder attention mechanism to focus on features and/or patterns of the individual unformatted textualized segments, as it continues to generate the individual formatted textualized segments.

The implementation of the encoder and the implementation of the decoder may be based on Transformer deep learning model, recurrent neural networks (RNNs), and/or other Sequence-to-Sequence based approaches.

The formatting rules may include transcribing numerals based on worded numbers, adding one or more hyphens to compound words, adding punctuation between words (e.g., a period, a comma, a semicolon, a colon, an exclamation point, a question mark, parentheses, brackets), adding punctuation between letters (e.g., an apostrophe), capitalization of a word, capitalization of a first letter, adding a slash, and/or other formatting rules.

Model storing component 138 may be configured to store a trained formatting model 140b, responsive to and subsequent to training formatting model 140a, to electronic storage 136, electronic storage 130, and/or other storage.

Referring back to FIG. 1A, server(s) 102 may include electronic storage 130 and may be configured by machine-readable instructions 106. Machine-readable instructions 106 may include one or more instruction components. The instruction components may include computer program components. The instruction components may include one or more of model employment component 108, termination component 110, audio obtainment component 112, audio processing component 114, text transmission component 116, and/or other instruction components.

Electronic storage 130 may store trained formatting model 140b, a context parameter, and/or other information. Trained formatting model 140b may be configured to format individual unformatted textualized inputs. Individual unformatted textualized inputs may be made up of individual sets of unformatted textualized segments that proceed from individual beginnings to individual ends. The unformatted textualized inputs may represent speech of users, conveying notes, that proceed from individual speech beginnings to individual speech ends. A given speech beginning may denote when a given user began speaking, and thus began dictating a given note for recordation. A given speech end may denote when the given user completed speaking, and thus completed dictating the given note. The individual textualized segments may include one or more texts of words that represent utterances of the users.

The value to the context parameter may provide contextual support for the trained formatting model to format the individual unformatted textualized segments. The value to the context parameter may be a given formatted text segment that preceded the next unformatted textualized segment. The contextual support may include a knowledge domain (e.g., medicine, auto mechanics, education), a regional lexicon (e.g., commonly used terms in a particular region), a recently occurred event (e.g., a surgery, fender bender), an upcoming event (e.g., an x-ray, an automobile race), a subject (e.g., a patient, a vehicle), and/or other contextual support that the unformatted and formatted textualized segments are related to. In some implementations, the context used to train formatting model 140a may include similar contextual support.

In some implementations, audio obtainment component 112 may be configured to receive an indication to obtain an audio input. The indication to obtain may include selection of a user interface element via client computing platform 104, utterance of a keyword or key phrase, selection of a physical button on client computing platform 104, and/or other indications. The user interface elements may be configured to facilitate user interaction with the user interface, user entry, and/or selection. By way of non-limiting illustration, the user interface elements may include one or more of text input fields, drop down menus, check boxes, display windows, virtual buttons, and/or other user interface elements. The selection of a given user interface element or physical button may include various selection combinations, such as double tap/click or holding down the given user interface element or physical button. The obtainment of the audio input may be responsive to receipt of the indication to obtain the audio input.

The audio input may represent the speech uttered by the user from the speech beginning to the speech end. The audio input may be made up of audio segments. Individual ones of the audio segments may include digital audio signals that encode sounds of individual utterances of the user, a recording of the individual utterances of the user, semantics of words in the individual utterances, and/or other audio information. In some implementations, the sounds of the utterances of the user may be detected by an audio input device, such as a microphone, of client computing platform 104. In some implementations, the sounds may be converted to the digital audio signals by converting analog waves to the digital audio signals by precisely measuring the analog waves at consistent and frequent intervals.

The recording of the individual utterances may include a digital file of a reproduction of the digital audio signals that cause the sounds, and thus convey the utterances, the digital audio signals, and/or other recording. The semantics may include a definition, a most common definition, common contexts, and/or other information that conveys a meaning of the words.

In some implementations, audio obtainment component 112 may be configured to obtain the audio input that corresponds to the unformatted textualized input. That is, both the audio input and the unformatted textualized input may represent the speech of the user from the speech beginning to the speech end. The audio input may be obtained responsive to the indication to obtain the audio input. In some implementations, the audio input may be obtained from client computing platform 104 associated with the user.

Audio processing component 114 may be configured to process individual ones of the audio segments to generate individual ones of the unformatted textualized segments. Processing the individual audio segments may include employing known and/or novel automatic speech recognition techniques on the individual audio segments that output the unformatted textualized segments.

In some implementations, audio obtainment component 112 may be configured to terminate the obtainment of the audio input in responsive to the indication to terminate the obtainment. In some implementations, the audio input may be obtained in an ongoing manner until a receipt of an indication to terminate obtainment of the audio input. The term "ongoing manner", as used herein, may refer to continuing to perform an action (e.g., obtain) continuously or periodically (e.g., every 30 seconds, every minute, every hour, etc.) until receipt of an indication to terminate. That is, audio obtainment component 112 may be continuously determining whether the audio input devices of client computing platform 104 are detecting any sounds from the user.

In some implementations, audio obtainment component 112 may be configured to receive the indication to terminate the obtainment of the audio input. The indication to terminate the obtainment may be similar to or the same as the indication to obtain. By way of non-limiting example, the indication to terminate may include one of an amount of time that elapses after obtainment of the next unformatted textualized segment, selection of a particular user interface element presented via or on the client computing platform, utterance of a termination term, and/or other indications to terminate.

In some implementations, text transmission component 116 may be configured to transmit the individual unformatted textualized segments to trained formatting model 140b. Employing trained formatting model 140b may be responsive to receipt of the unformatted textualized segment that begins the unformatted textualized input.

Model employment component 108 may be configured to employ trained formatting model 140b. By way of non-limiting example, trained formatting model 140b may be employed to format an unformatted textualized input made up of unformatted textualized segments. The employment of trained formatting model 140b may be in an ongoing manner until receipt of the indication to terminate the employment. In some implementations, trained formatting model 140b may be stateless. That is, trained formatting model 140b may not be continuously employed or online. Rather, trained formatting model 140b is only employed upon receiving input, i.e., the next unformatted textualized segment and the value to the context parameter, when applicable. In some implementations, trained formatting model 140b may be re-employed with regard to formatted textualized segments already output to correct and/or implement supplementary ones of the formatting rules. The re-employment may be responsive to a receipt of an indication to re-employ via client computing platform 104, and thus from the user, or may be preset to occur periodically. For example, while formatted textualized segments that make up a formatted text are stored in electronic storage 130 and/or 136, trained formatting model 140b may be re-employed every two weeks.

Trained formatting model 140b may format the unformatted textualized input by (a) obtaining a next unformatted textualized segment that represents an utterance by the user. The next unformatted textualized segment may refer to an unformatted textualized segment that is following a previous one or is an initial unformatted textualized segment of an unformatted textualized input. The term "next unformatted textualized segment" may be used herein to describe recursiveness of trained formatting model 140b.

Subsequently, (b) determining whether the context parameter is assigned a value may be performed by trained formatting model 140b. That is, it may be determined whether there is context to utilized when formatting the next unformatted textualized segment. Thus, (c) upon determination that the context parameter has the value, trained formatting model 140b may process the next unformatted textualized segment to generate a formatted textualized segment based on the value to the context parameter. Subsequently, trained formatting model 140b may assign the formatted textualized segment to the context parameter. In some implementations, the value assigned to the context parameter may be appended. Thus, the value assigned to the context parameter may be cumulative and include all previous values assigned to the context parameter so that all of the contextual support determined for the unformatted textualized input is utilized to generate the formatted textualized segment. In some implementations, the value assigned to the context parameter is merely the latest formatted textualized segment.

Conversely, (d) upon determination that the context parameter has no value, trained formatting model 140b may process the next unformatted textualized segment to generate the formatted textualized segment. The formatted textualized segment may be assigned to the context parameter. Trained formatting model 140b may (e) effectuate, subsequent to generating the formatted textualized segment, presentation of the formatted textualized segment via client computing platform 104. Thus, the user may view the formatting as it is being implemented, and while they may still be dictating.

Trained formatting model 140b may (f) return to (a) where the next unformatted textualized segment that may be obtained is adjacent to the formatted textualized segment that was previously formatted in either step (c) or step (d).

Termination component 110 may be configured to terminate, upon receipt of the indication to terminate the employment, employment of trained formatting model 140b. The indication to terminate the employment of trained formatting model 140b may be the same as or similar to one or more of the indications to obtain the audio input and the indications to terminate the obtainment of the audio input.

Figure 3:
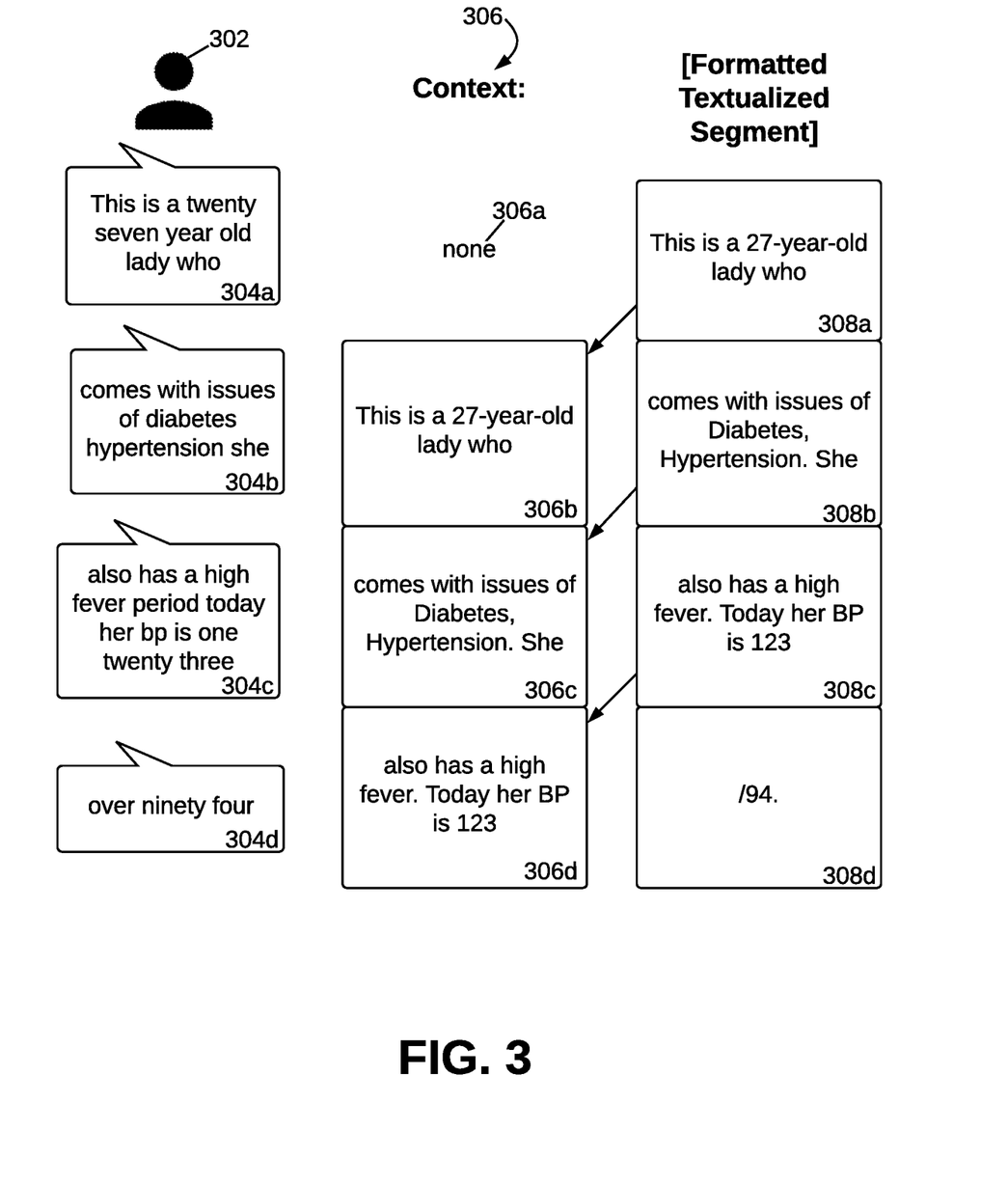
FIG. 3 illustrates an example implementation of the system configured to utilize a trained formatting model to format text generated automatically by natural language interpretation of speech to reflect context, in accordance with one or more implementations.

FIG. 3 illustrates a user 302 that may be dictating a note. User 302 may first utter an utterance represented by unformatted textualized segment 304a. Given that unformatted textualized segment 304a represents a first utterance from user 302, context parameter 306 for unformatted textualized segment 304a may be assigned nothing, i.e., none 306a. Thus, the trained formatting model (not illustrated) may have no context as a basis to format unformatted textualized segment 304a. The trained formatting model may format unformatted textualized segment 304a, based on no context, and generate formatted textualized segment 308a. Formatted textualized segment 308a may then be assigned to context parameter 306, i.e., value 306b.

Unformatted textualized segment 304b may represent a subsequent utterance by user 302. The trained formatting model may format unformatted textualized segment 304b based on context value 306b to generate formatted textualized segment 308b.

Formatted textualized segment 308b may then be assigned to context parameter 306, i.e., value 306c.

Unformatted textualized segment 304c may represent a subsequent utterance by user 302. The trained formatting model may format unformatted textualized segment 304c based on context value 306c to generate formatted textualized segment 308c. Formatted textualized segment 308c may then be assigned to context parameter 306, i.e., value 306d.

Unformatted textualized segment 304d may represent a subsequent utterance by user 302. The trained formatting model may format unformatted textualized segment 304d based on context value 306d to generate formatted textualized segment 308d. Thus, formatted textualized segments 308a-d collectively may comprise a formatted note.

In some implementations, server(s) 102, client computing platform(s) 104, and/or external resources 128 may be operatively linked via one or more electronic communication links. For example, such electronic communication links may be established, at least in part, via network 142 such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with network 142 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, information from server(s) 124, and/or other information that enables server(s) 102 to function as described herein. Electronic storage 136 may store software algorithms, information determined by processor(s) 134, information received from server(s) 124, information received from client computing platform(s) 104, information from server(s) 102, and/or other information that enables server(s) 124 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 120, and/or 122, and/or other components. Processor(s) 132 may be configured to execute components 108, 110, 112, 114, 116, 120, and/or 122, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 120, and/or 122 are illustrated in FIG. 1 as being implemented within multiple processing units, in implementations in which processor(s) 132 and 134 include single processing unit, one or more of components 108, 110, 112, 114, 116, 120, and/or 122 may be implemented remotely from one or more of the other components. The description of the functionality provided by the different components 108, 110, 112, 114, 116, 120, and/or 122 described below is for illustrative purposes, and is not intended to be limiting, as any of components 108, 110, 112, 114, 116, 120, and/or 122 may provide more or less functionality than is described. For example, one or more of components 108, 110, 112, 114, 116, 120, and/or 122 may be eliminated, and some or all of its functionality may be provided by other ones of components 108, 110, 112, 114, 116, 120, and/or 122. As another example, processor(s) 132 may be configured to execute one or more additional components that may perform some or all of the functionality attributed below to one of components 108, 110, 112, 114, 116, 120, and/or 122.

Figure 2:
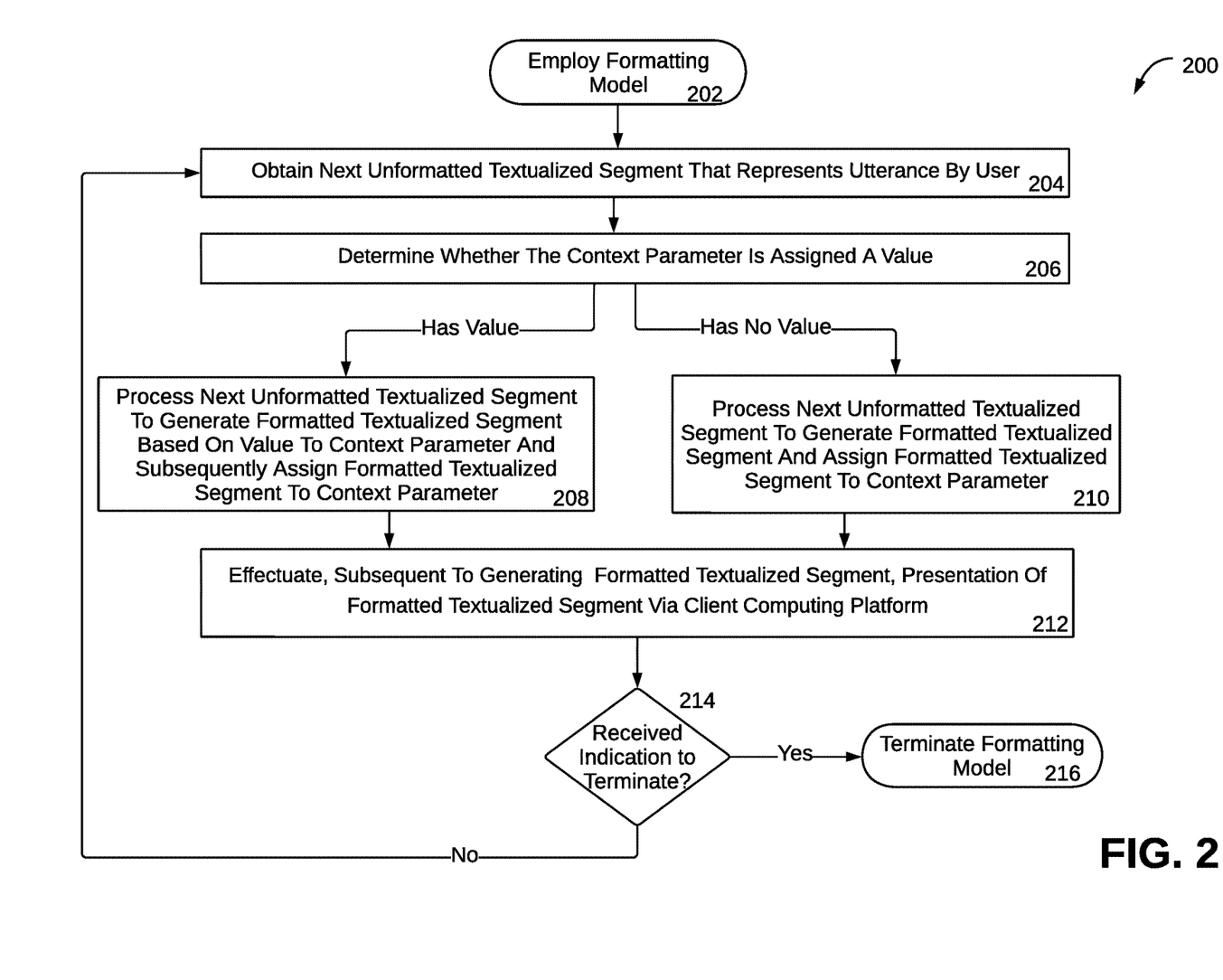
FIG. 2 illustrates a method to utilize a trained formatting model to format text generated automatically by natural language interpretation of speech to reflect context, in accordance with one or more implementations.

FIG. 2 illustrates a method 200 to utilize a trained formatting model to format text generated automatically by natural language interpretation of speech to reflect context, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include employing, in an ongoing manner until receipt of an indication to terminate, a trained formatting model to format an unformatted textualized input made up of unformatted textualized segments that proceed from a beginning to an end. Electronic storage may store the trained formatting model and a context parameter. The trained formatting model may be configured to format individual unformatted textualized inputs. Operation 202 may be performed by one or more hardware processors configured by machine-readable instructions including a component that is the same as or similar to model employment component 108 and electronic storage 130, in accordance with one or more implementations.

An operation 204 may include obtaining a next unformatted textualized segment that represents an utterance by a user. Operation 204 may be performed by the trained formatting model 140*b*.

An operation 206 may include determining whether the context parameter is assigned a value. Upon determination that the context parameter has the value, an operation 208 may follow. Upon determination that the context parameter has no value, an operation 210 may follow. Operation 206 may be performed by the trained formatting model 140*b*.

An operation 208 may include processing the next unformatted textualized segment to generate a formatted textualized segment based on the value to the context parameter. Subsequently, the formatted textualized segment may be assigned to the context parameter. Operation 208 may be performed by the trained formatting model 140*b*.

An operation 210 may include processing the next unformatted textualized segment to generate the formatted textualized segment and, subsequently, assign the formatted textualized segment to the context parameter. Operation 210 may be performed by the trained formatting model 140*b*.

An operation 212 may include effectuating, subsequent to generating the formatted textualized segment, presentation of the formatted textualized segment via client computing platform 104. Operation 212 may be performed by the trained formatting model 140*b*.

An operation 214 may include determining whether an indication to terminate employment of the trained formatting model has been received. Upon receipt of the indication to terminate, an operation 216 may follow operation 214 and terminate the employment of the trained formatting model. Upon no receipt of the indication to terminate, an operation 204 may follow operation 214. Operation 214 may be performed by the trained formatting model 140*b*.

An operation 216 may include terminating, upon receipt of the indication to terminate, employment of the trained formatting model 140*b*. Operation 216 may be performed by one or more hardware processors configured by machine-readable instructions including a component that is the same as or similar to termination component 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to utilize a trained formatting model to format text generated automatically by natural language interpretation of speech to reflect context, the system comprising:
   electronic storage that stores the trained formatting model and a context parameter, wherein the trained formatting model is configured to format individual unformatted textualized inputs, wherein the trained formatting model is trained based on a set of unfinalized transcripts and a set of corresponding finalized transcripts; and
   one or more processors configured by machine-readable instructions to:
      employ, in an ongoing manner until receipt of an indication to terminate employment of the trained formatting model, the trained formatting model to format an unformatted textualized input made up of individual unformatted textualized segments that proceed from a beginning to an end, the individual unformatted textualized segments including a set of texts of multiple words uttered by a user, wherein the unformatted textualized input is formatted via the employment of the trained formatting model by:
         (a) obtaining a next unformatted textualized segment that includes a next set of texts of multiple words uttered by the user;
         (b) determining whether the context parameter is assigned a value, wherein the value to the context parameter includes entirety of previously formatted text segment that preceded the next unformatted textualized segment, the entirety of previously formatted text segment including a preceding set of text of multiple words uttered by the user that has been modified using formatting rules that include transcribing numerals based on worded numbers, adding a comma between words, capitalizing a word, capitalizing a first letter, and adding a period at the end of a sentence;
         (c) upon determination that the context parameter has been assigned the value, processing the next unformatted textualized segment to generate a formatted textualized segment based on the value to the context parameter, wherein the next set of texts of multiple words uttered by the user are modified using the formatting rules and the entirety of previously formatted text segment that preceded the next unformatted textualized segment, and subsequently assign entirety of the formatted textualized segment to the context parameter;
         (d) upon determination that the context parameter has not been assigned the value, processing the next unformatted textualized segment to generate the formatted textualized segment, wherein the next set of texts of multiple words uttered by the user are modified using the formatting rules, and subsequently assign entirety of the formatted textualized segment to the context parameter;
         (e) effectuating, subsequent to generating the formatted textualized segment, presentation of the formatted textualized segment via a client computing platform; and
         (f) returning to (a), wherein the next unformatted textualized segment that is obtained is adjacent to the formatted textualized segment that was formatted in either step (c) or step (d); and
      terminate, upon receipt of the indication to terminate the employment of the trained formatting model, the employment of the trained formatting model.

2. The system of claim 1, wherein the one or more processors are further configured by the machine-readable instructions to:
   obtain, from the client computing platform, an audio input that corresponds to the unformatted textualized input until receipt of an indication to terminate obtainment of the audio input, wherein the audio input is made up of audio segments;
   process individual ones of the audio segments to generate the individual unformatted textualized segments; and
   transmit the individual unformatted textualized segments to the trained formatting model, wherein employing the trained formatting model is responsive to receipt of the unformatted textualized segment that begins the unformatted textualized input.

3. The system of claim 2, wherein the individual ones of the audio segments include digital audio signals that encode sounds of an utterance of the user, a recording of the utterance of the user, and/or semantics of words in the utterance.

4. The system of claim 2, wherein the one or more processors are further configured by the machine-readable instructions to:
   receive an indication to obtain the audio input, wherein the obtainment of the audio input is responsive to receipt of the indication to obtain the audio input.

5. The system of claim 4, wherein the one or more processors are further configured by the machine-readable instructions to:
   receive an indication to terminate the obtainment of the audio input; and
   terminate the obtainment of the audio input in responsive to the indication to terminate the obtainment.

6. The system of claim 1, wherein the indication to terminate the employment of the trained formatting model includes one of: an amount of time that elapses after obtainment of the next unformatted textualized segment, selection of a particular user interface element presented via or on the client computing platform, and utterance of a termination term.

7. A system configured to train a formatting model to format individual text inputs, the system comprising:
   electronic storage that stores at least the formatting model and training information, wherein the training information includes (i) unfinalized transcripts that individually represent a set of utterance from users, wherein individual ones of the unfinalized transcripts are made up of unformatted text segments, (ii) finalized transcripts that correspond to the unfinalized transcripts, wherein the finalized transcripts are made up of formatted text segments, and (iii) context to the unformatted text segments, wherein the context includes individual ones of entirety of the formatted text segments that precede individual ones of the unformatted text segments, wherein individual unformatted textualized segments include a set of texts of multiple words and individual formatted text segments include corresponding ones of the individual unformatted textualized segments that have been modified using formatting rules that include transcribing numerals based on worded numbers, adding a comma between words, capitalizing a word, capitalizing a first letter, and adding a period at the end of a sentence; and one or more processors configured by machine-readable instructions to:
obtain the formatting model;
obtain the training information;
train the formatting model to format individual unformatted text inputs by using the unformatted text segments and the context as training inputs and the formatted text segments as training outputs such that the formatting model is trained to determine the formatting rules implemented in the formatted text segments based on the unformatted text segments and the context; and
store the trained formatting model to the electronic storage.

8. The system of claim 7, wherein the formatting model includes an encoder and a decoder, wherein training the formatting model includes:
inputting the unformatted text segments to the encoder to generate high-dimensional representations of the unformatted text segments; and
inputting the high-dimensional representations to the decoder to generate the formatted textualized segment.

9. The system of claim 7, wherein the formatting rules further include adding one or more hyphens to compound words and/or adding a slash.

10. A method to utilize a trained formatting model to format text generated automatically by natural language interpretation of speech to reflect context, the method comprising:
employing, in an ongoing manner until receipt of an indication to terminate employment of the trained formatting model, a trained formatting model to format an unformatted textualized input made up of individual unformatted textualized segments that proceed from a beginning to an end by, wherein electronic storage stores the trained formatting model and a context parameter, wherein the trained formatting model is configured to format individual unformatted textualized inputs, wherein the trained formatting model is trained based on a set of unfinalized transcripts and a set of corresponding finalized transcripts, wherein the individual unformatted textualized segments including a set of texts of multiple words uttered by a user and the unformatted textualized input is formatted via the employment of the trained formatting model by:
(a) obtaining a next unformatted textualized segment that includes a next set of texts of multiple words uttered by the user;
(b) determining whether the context parameter is assigned a value, wherein the value to the context parameter includes entirety of previously formatted text segment that preceded the next unformatted textualized segment, the entirety of previously formatted text segment including a preceding set of text of multiple words uttered by the user that has been modified using formatting rules that include transcribing numerals based on worded numbers, adding a comma between words, capitalizing a word, capitalizing a first letter, and adding a period at the end of a sentence;
(c) upon determination that the context parameter has been assigned the value, processing the next unformatted textualized segment to generate a formatted textualized segment based on the value to the context parameter, wherein the next set of texts of multiple words uttered by the user are modified using the formatting rules and the entirety of previously formatted text segment that preceded the next unformatted textualized segment, and subsequently assign entirety of the formatted textualized segment to the context parameter;
(d) upon determination that the context parameter has not been assigned the value, processing the next unformatted textualized segment to generate the formatted textualized segment, wherein the next set of texts of multiple words uttered by the user are modified using the formatting rules, and subsequently assign the formatted textualized segment to the context parameter; and
(e) effectuating, subsequent to generating the formatted textualized segment, presentation of the formatted textualized segment via a client computing platform; and
(f) returning to (a), wherein the next unformatted textualized segment that is obtained is adjacent to the formatted textualized segment that was formatted in either step (c) or step (d); and
terminating, upon receipt of the indication to terminate, employment of the trained formatting model.

11. The method of claim 10, further comprising:
obtaining, from the client computing platform, an audio input that corresponds to the unformatted textualized input until receipt of an indication to terminate obtainment of the audio input, wherein the audio input is made up of audio segments;
processing individual ones of the audio segments to generate the individual unformatted textualized segments; and
transmitting the individual unformatted textualized segments to the trained formatting model, wherein employing the trained formatting model is responsive to receipt of the unformatted textualized segment that begins the unformatted textualized input.

12. The method of claim 11, wherein the individual ones of the audio segments include digital audio signals that encode sounds of an utterance of the user, a recording of the utterance of the user, and/or semantics of words in the utterance.

13. The method of claim 11, further comprising:
receiving an indication to obtain the audio input, wherein the obtainment of the audio input is responsive to receipt of the indication to obtain the audio input.

14. The method of claim 13, further comprising:
receiving an indicate to terminate the obtainment of the audio input; and
terminating the obtainment of the audio input in responsive to the indication to terminate the obtainment.

15. The method of claim 10, wherein the indication to terminate the employment of the trained formatting model includes one of: an amount of time that elapses after obtainment of the next unformatted textualized segment, selection of a particular user interface element presented via or on the client computing platform, and utterance of a termination term.

16. A method to train a formatting model to format individual text inputs, the method comprising:
obtaining the formatting model, wherein electronic storage stores at least the formatting model and training information, wherein the training information includes (i) unfinalized transcripts that individually represent a set of utterance from users, wherein individual ones of the unfinalized transcripts are made up of unformatted text segments, (ii) finalized transcripts that correspond to the unfinalized transcripts, wherein the finalized transcripts are made up of formatted text segments, and (iii) context to the unformatted text segments, wherein the context includes individual ones of entirety of the formatted text segments that precede individual ones of the unformatted text segments, wherein individual unformatted textualized segments include a set of texts of multiple words and individual formatted text segments include corresponding ones of the individual unformatted textualized segments that have been modified using formatting rules that include transcribing numerals based on worded numbers, adding a comma between words, capitalizing a word, capitalizing a first letter, and adding a period at the end of a sentence;

obtaining the training information;

training the formatting model to format individual unformatted text inputs by using the unformatted text segments and the context as training inputs and the formatted text segments as training outputs such that the formatting model is trained to determine formatting rules implemented in the formatted text segments based on the unformatted text segments and the context; and storing the trained formatting model to the electronic storage.

17. The method of claim 16, wherein the formatting model includes an encoder and a decoder, wherein training the formatting model includes:

inputting the unformatted text segments to the encoder to generate high-dimensional representations of the unformatted text segments; and inputting the high-dimensional representations to the decoder to generate the formatted textualized segment.

18. The method of claim 16, wherein the formatting rules further include adding one or more hyphens to compound words and/or adding a slash.

\* \* \* \* \*